(12) United States Patent
Wang

(10) Patent No.: US 11,373,054 B2
(45) Date of Patent: Jun. 28, 2022

(54) OBJECT RECOGNITION METHOD AND MOBILE TERMINAL

(71) Applicant: VIVO MOBILE COMMUNICATION CO., LTD., Guangdong (CN)

(72) Inventor: Qiang Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/159,377

(22) Filed: Jan. 27, 2021

(65) Prior Publication Data

US 2021/0150171 A1 May 20, 2021

Related U.S. Application Data

(63) Continuation-in-part of application No. PCT/CN2019/096697, filed on Jul. 19, 2019.

(30) Foreign Application Priority Data

Jul. 27, 2018 (CN) .......................... 201810847920.5

(51) Int. Cl.
*G06K 7/14* (2006.01)
*H04N 5/232* (2006.01)
(Continued)

(52) U.S. Cl.
CPC ....... *G06K 7/1443* (2013.01); *G06F 3/04886* (2013.01); *G06F 3/167* (2013.01);
(Continued)

(58) Field of Classification Search
CPC ................ G06K 7/1443; G06K 7/1417; G06F 3/04886; G06F 3/167; G06F 3/002;
(Continued)

(56) References Cited

U.S. PATENT DOCUMENTS 7,302,089 B1 11/2007 Smits
2017/0215069 A1 7/2017 Nakajima

FOREIGN PATENT DOCUMENTS

CN 104410785 A 3/2015
CN 107085718 A 8/2017
(Continued)

OTHER PUBLICATIONS

English translation of KR 102011008826 (Year: 2013).*
(Continued)

*Primary Examiner* — Matthew Mikels
(74) *Attorney, Agent, or Firm* — Harness, Dickey & Pierce, P.L.C.

(57) ABSTRACT

An object recognition method includes: acquiring a first image through a camera in a first operating state in a case where a mobile terminal is in a screen-off state; if the first image has image characteristics of a target object type, controlling the camera to enter a second operating state, and acquiring a second image through the camera in the second operating state; and if it is recognized that the second image includes an incomplete image with the image characteristics, outputting prompt information for indicating that the second image is incomplete, an operating power of the camera in the second operating state being higher than an operating power of the camera in the first operating state.

15 Claims, 6 Drawing Sheets

(51) Int. Cl.
*G06F 3/04886* (2022.01)
*G06F 3/16* (2006.01)

(52) U.S. Cl.
CPC ....... *G06K 7/1417* (2013.01); *H04N 5/23245* (2013.01); *H04N 5/232411* (2018.08)

(58) Field of Classification Search
CPC .............. G06F 3/005; H04N 5/232411; H04N 5/23245; H04N 5/23218; H04N 5/232941; H04M 2250/52; H04M 1/72403; H04M 1/72439; H04M 1/72469; H04M 1/72484
See application file for complete search history.

(56) References Cited

FOREIGN PATENT DOCUMENTS

| CN | 107742072 A | 2/2018 |
|----|-------------|--------|
| CN | 107943524 A | 4/2018 |
| CN | 108259667 A | 7/2018 |
| CN | 109151180 A | 1/2019 |
| EP | 2624537 A1  | 8/2013 |

OTHER PUBLICATIONS

Supplementary European Search Report regarding Application No. 19841464.1-1216/3829148, PCT/CN2019/096697, dated Aug. 31, 2021.
International Search Report and Written Opinion of the International Searching Authority regarding International Patent Application No. PCT/CN2019/096697, dated Oct. 22, 2019. Translation provided by Bohui Intellectual Property.
First Office Action regarding Chinese Patent Application No. 201810847920.5, dated Oct. 25, 2019. Translation provided by Bohui Intellectual Property.
Second Office Action regarding Chinese Patent Application No. 201810847920.5, dated Apr. 17, 2020. Translation provided by Bohui Intellectual Property.

* cited by examiner

OBJECT RECOGNITION METHOD AND MOBILE TERMINAL

CROSS-REFERENCE TO RELATED APPLICATION

This application is a Bypass Continuation-in-part Application of PCT/CN2019/096697 filed Jul. 19, 2019, which claims priority to Chinese Patent Application No. 201810847920.5, filed in China on Jul. 27, 2018, titled "OBJECT RECOGNITION METHOD AND MOBILE TERMINAL", which are incorporated herein by reference in their entirety.

TECHNICAL FIELD

The present disclosure relates to the field of communication technologies, and in particular, to an object recognition method and a mobile terminal.

BACKGROUND

With rapid development of mobile terminals, technologies such as face recognition and payment by scanning a code have become common functions in people's life, and these functions are achieved by turning on a camera of a mobile terminal and acquiring information of a scanned object such as a face or a two-dimensional code through the camera, thereby recognizing the information of the scanned object.

SUMMARY

In a first aspect, some embodiments of the present disclosure provide an object recognition method, performed at a mobile terminal with a camera. The object recognition method includes:

acquiring a first image through a camera in a first operating state in a case where a mobile terminal is in a screen-off state;

if the first image has image characteristics of a target object type, controlling the camera to enter a second operating state, and acquiring a second image through the camera in the second operating state; and if it is recognized that the second image includes an incomplete image with the image characteristics, outputting prompt information for indicating that the second image is incomplete, wherein an operating power of the camera in the second operating state is higher than an operating power of the camera in the first operating state.

In a second aspect, some embodiments of the present disclosure further provide a mobile terminal. The mobile terminal has a camera and a processor connected with the camera. The processor is configured to: acquiring a first image through a camera in a first operating state in a case where a mobile terminal is in a screen-off state; if the first image has image characteristics of a target object type, controlling the camera to enter a second operating state, and acquiring a second image through the camera in the second operating state; and if it is recognized that the second image includes an incomplete image with the image characteristics, outputting prompt information for indicating that the second image is incomplete; an operating power of the camera in the second operating state is higher than an operating power of the camera in the first operating state.

In a third aspect, some embodiments of the present disclosure further provide a non-transitory computer-readable storage medium. The non-transitory computer-readable storage medium stores computer programs that, when executed by a processor, cause the processor to perform steps of the object recognition method described above.

BRIEF DESCRIPTION OF THE DRAWINGS

In order to describe technical solutions in embodiments of the present disclosure more clearly, accompanying drawings to be used in the description of the embodiments of the present disclosure will be briefly introduced below. Obviously, the accompanying drawings to be described below are merely some embodiments of the present disclosure, and a person of ordinary skill in the art may obtain other drawings according to these drawings without paying any creative effort.

DETAILED DESCRIPTION

Technical solutions in embodiments of the present disclosure will be described below clearly and completely with reference to the accompanying drawings in the embodiments of the present disclosure. Obviously, the described embodiments are merely some but not all embodiments of the present disclosure. All other embodiments made on a basis of the embodiments of the present disclosure by a person of ordinary skill in the art without paying any creative effort shall be included in the protection scope of the present disclosure.

The term "and/or" herein is merely used to describe an association relationship of associated objects, which represents three kinds of relationships. For example, the phrase "A and/or B" represents three conditions: A exists alone, both A and B exist, and B exists alone. In addition, the character "/" herein generally indicates that the associated objects are in an "or" relationship. The character "/" in a formula indicates that the associated objects are in a "division" relationship. The term "plurality" herein means two or more unless otherwise specified.

In the related art, when functions such as the face recognition or the payment by scanning a code are performed, a user needs to perform a series of operations. The following will be described by taking an example in which the user performs the payment by scanning a code. When a user performs the payment by scanning a code, a screen of the mobile terminal is firstly lightened, then the mobile terminal is unlocked, an application program is opened based on input of the user, and a code scanning function is triggered to be started through the input of the user in the opened application program, which causes a low code scanning efficiency.

Figure 1A:
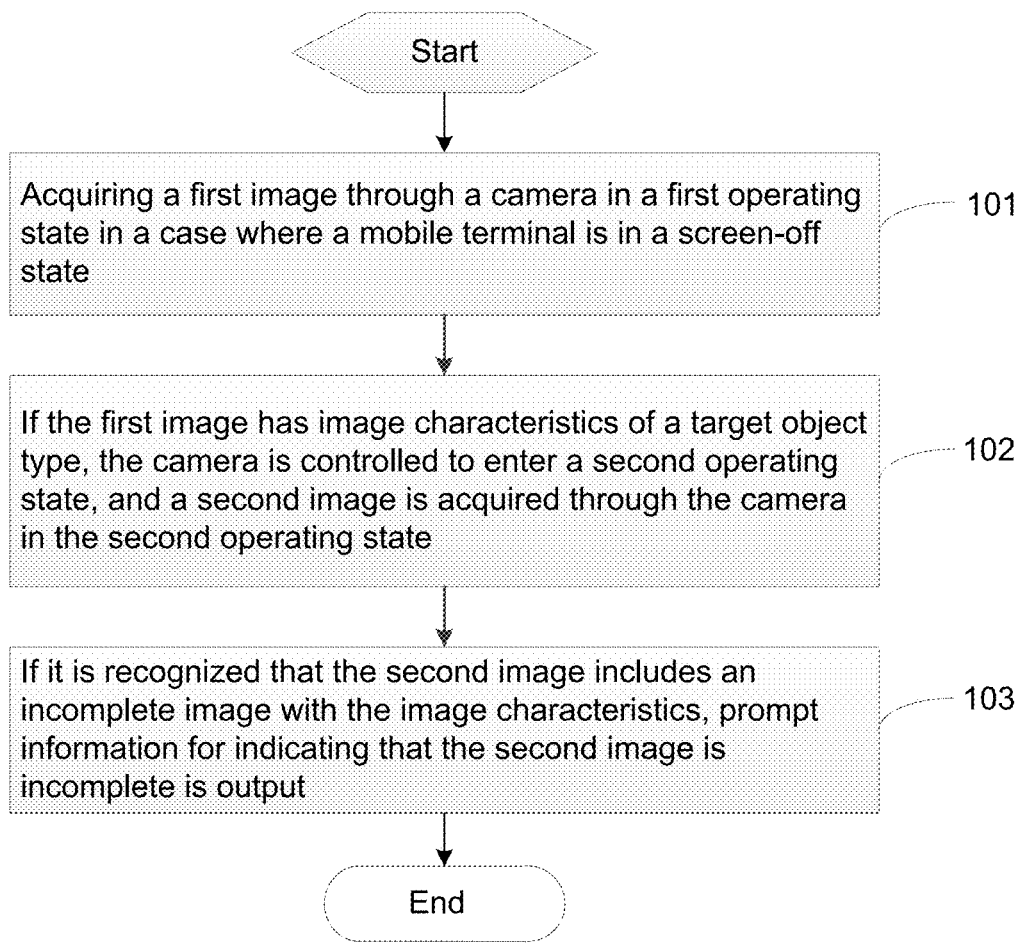
FIG. 1A is a first flow diagram of an object recognition method, in accordance with embodiments of the present disclosure.

Referring to FIG. 1A, FIG. 1A is a flow diagram of an object recognition method, in accordance with embodiments of the present disclosure. The method is performed at a mobile terminal with a camera as shown in FIG. 1A, the object recognition method includes the following steps.

In step 101, acquiring a first image through a camera in a first operating state in a case where a mobile terminal is in a screen-off state.

An operating power of the camera in the first operating state is less than a preset power value. The preset power value may be a value preset by the mobile terminal or a value set in advance when the mobile terminal receives a user operation. The operating power of the camera in the first operating state is low, and energy consumption is low. For example, the camera operates in a low power consumption operating state with an operating power of less than 50 milliwatts, 60 milliwatts, 100 milliwatts or the like.

The mobile terminal may control the camera to be in the first operating state by turning on part of pixel units of the camera. For example, in a 12-megapixel camera, three hundred thousand pixel units are uniformly selected to operate, and remaining pixel units do not operate, and this operating state is the first operating state. A power of the camera when only part of the pixel units operate is less than the preset power value, and the camera may acquire a scanned object at any time by using the turn-on part of the pixel units, so that power consumption may be saved.

The screen-off state may be understood as a state when the mobile terminal is operating and information is not displayed on the screen, such as a state when information is not displayed on the screen of the mobile terminal after the screen of the mobile terminal is locked. In this step, when the mobile terminal is in the screen-off state, the camera is in a turn-on state and operates in the first operating state.

During a specific implementation, the user may set the camera of the mobile terminal to automatically turn on when the mobile terminal is started up and to continuously operate in the first operating state, which facilitates the camera to acquire the scanned object at any time. The camera may also be controlled to automatically turn on in the screen-off state, that is, the camera only turns on in the screen-off state and turns off in a screen-on state, so that the power consumption may be further saved.

In step 102, if the first image has image characteristics of a target object type, the camera is controlled to enter a second operating state, and a second image is acquired through the camera in the second operating state.

An operating power of the camera in the second operating state is higher than the operating power of the camera in the first operating state. The second operating state may be an operating state in which part of the pixel units of the camera are turned on or all of the pixel units of the camera are turned on. In a case where the number of pixel units turned on in the second operating state is larger than the number of pixel units turned on in the first operating state, the operating power of the camera in the second operating state is higher than the operating power of the camera in the first operating state. For example, the camera may be set to have multiple gears according to the operating power of the camera from low to high. When an image of the target object type is detected and recognized through the camera in a gear corresponding to a lowest power, the gear corresponding to the lowest power may be switched to other gears.

The power of the camera in the first operating state is low, the first image acquired through the camera in the first operating state may be preliminarily recognized, and it is determined whether the first image has the image characteristics of the target object type. The target object types may be object types with specific characteristics preset by the mobile terminal, which include a human face, a two-dimensional code, and a gesture. For example, image characteristics of the two-dimensional code include three positioning points in a shape of a Chinese character of "回", image characteristics of the human face include distribution positions and characteristics of five sense organs, and image characteristics of the gesture include shape characteristics of the gesture. If the first image has the image characteristics of the target object type, the camera is switched from the first operating state to the second operating state.

Taking the two-dimensional code as an example, if it is recognized that the first image has the image characteristics of the two-dimensional code, the camera is switched from the first operating state to the second operating state, and acquires the two-dimensional code again. Since the operating power in the second operating state is higher than the operating power in the first operating state, the number of pixels of the second image acquired through the camera in the second operating state is greater than the number of pixels of the first image, so that specific contents of the two-dimensional code may be further recognized based on the second image, and an image recognition error may be reduced.

In step 103, if it is recognized that the second image includes an incomplete image with the image characteristics, prompt information for indicating that the second image is incomplete is output.

Figure 1B:
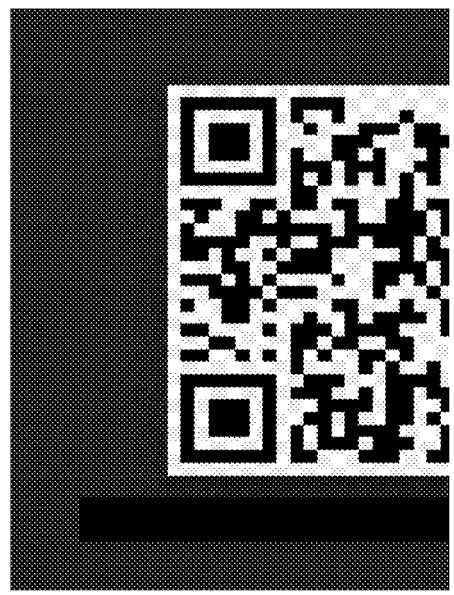
FIG. 1B shows an incomplete image of a two-dimensional code, in accordance with embodiments of the present disclosure.

In this step, the mobile terminal recognizes characteristics of the second image, and if the mobile terminal recognizes that the second image includes the image characteristics of the target object type and the image is an incomplete image, the mobile terminal outputs prompt information to prompt that the second image is an incomplete image. As for a specific recognition manner of the image characteristics of the target object type, reference may be made to the recognition manner in the step 102. Determination of an incomplete image may be based on the image characteristics of the target object type. For example, the image shown in FIG. 1B is an incomplete image of a two-dimensional code. A complete image of the two-dimensional code includes three positioning points in the shape of the Chinese character of " 回 ", and if only two positioning points in the shape of the Chinese character of " 冋 " are detected, the image may be regarded as an incomplete image of the two-dimensional code. For example, a complete face image includes images of the five sense organs and an image of the face, and if only images of eyes and an image of a nose are detected in the image, the image may be an incomplete face image. The prompt information may be prompted by displaying an incomplete image on the screen, outputting voice, vibrating, or the like. For example, the incomplete image shown in FIG. 1B is displayed on the screen, and the user may move the mobile terminal to the right based on the image to acquire the complete image of the two-dimensional code, thereby improving efficiency of recognizing the two-dimensional code.

In some embodiments of the present disclosure, the object recognition method may be applied to a mobile terminal, such as a mobile phone, a tablet personal computer, a laptop computer, a personal digital assistant (PDA), a mobile Internet device (MID), or a wearable device.

For the object recognition method in some embodiments of the present disclosure, in the case where the mobile terminal is in the screen-off state, the first image is acquired through the camera in the first operating state; if the first image has the image characteristics of the target object type, the camera is controlled to enter the second operating state, and the second image is acquired through the camera in the second operating state; and if it is recognized that the second image includes the incomplete image with the image characteristics, the prompt information for indicating that the second image is incomplete is output; the operating power of the camera in the second operating state is higher than the operating power of the camera in the first operating state. Therefore, the mobile terminal may acquire the scanned object in the screen-off state without a need to perform a series of interactive operations by the user to start a code scanning function for acquisition, which may improve code scanning efficiency. Moreover, when an incomplete image of the target object type is recognized, prompt information may be output to prompt the user to shift the mobile terminal to acquire a complete image, which can further improve object recognition efficiency.

Figure 2A:
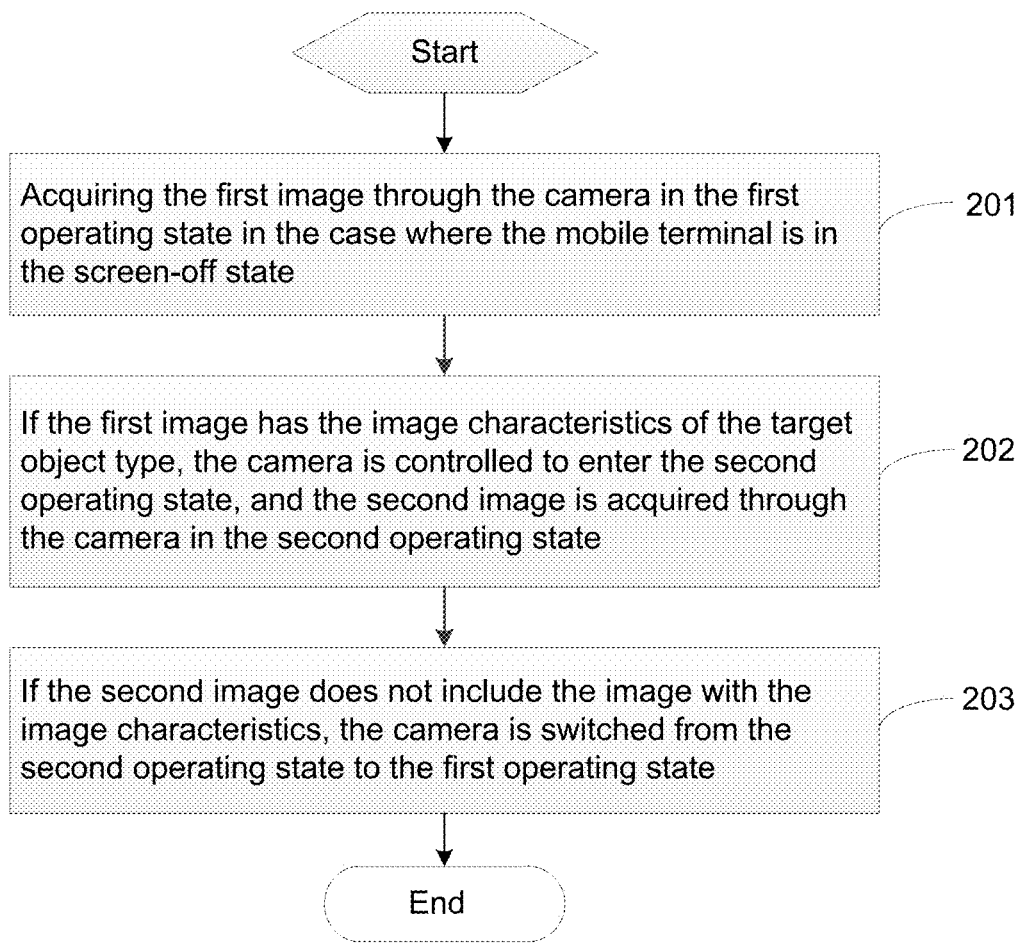
FIG. 2A is a second flow diagram of an object recognition method, in accordance with embodiments of the present disclosure.

Referring to FIG. 2A, a main difference between the present embodiment and the above embodiments is that if the second image does not include the image with the image characteristics, the camera is switched from the second operating state to the first operating state. FIG. 2A is a flow diagram of an object recognition method, in accordance with embodiments of the present disclosure. The method is applied to a mobile terminal with a camera, as shown in FIG. 2A, the object recognition method includes the following steps.

In step 201, acquiring the first image through the camera in the first operating state in the case where the mobile terminal is in the screen-off state.

The operating power of the camera in the first operating state is less than the preset power value.

As for implementations of this step, reference may be made to the description in the step 101, and details will not be repeated herein to avoid repetition.

In step 202, if the first image has the image characteristics of the target object type, the camera is controlled to enter the second operating state, and the second image is acquired through the camera in the second operating state.

The operating power of the camera in the second operating state is higher than the operating power of the camera in the first operating state.

As for implementations of this step, reference may be made to the description in the step 102, and details will not be repeated herein to avoid repetition.

In step 203, if the second image does not include the image with the image characteristics, the camera is switched from the second operating state to the first operating state.

Since the number of pixels of the image acquired by the camera in the first operating state is small, there may be misrecognition of the image. In this step, the mobile terminal recognizes the second image, and determines whether there is the image with the image characteristics of the target object type in the second image. If the second image does not include the image with the image characteristics of the target object type, it is indicated that the mobile terminal misrecognizes the first image, that is, there is actually no image with the image characteristics in the first image, and the camera is switched from the second operating state to the first operating state.

For example, after the mobile terminal recognizes that the first image includes the image of the two-dimensional code, the camera is switched from the first operating state of a low power consumption mode to the second operating state of a common photographing mode. Since a resolution of the second image acquired in the common photographing mode is high, an accuracy of recognition based on the second image is high. If it is recognized that there is no image of the two-dimensional code in the second image, it is indicated that the first image is misrecognized, and the camera is switched from the second operating state to the first operating state, which may save the power consumption.

Optionally, after the second image is acquired through the camera in the second operating state, the method further includes: if the second image includes the complete image with the image characteristics, controlling the screen of the mobile terminal to be lit up and controlling the screen to display a recognition result of the complete image.

In this implementation, the mobile terminal recognizes the second image and determines whether the second image includes the complete image with the image characteristics of the target object type. The complete image may be understood as having all the image characteristics of the target object type. For example, the target object type is a two-dimensional code, and image characteristics of the two-dimensional code include three positioning points in a shape of a Chinese character of " 回 " and geometric figures distributed according to preset conditions. If three positioning points in the shape of the Chinese character of " 回 " are detected, and distribution characteristics of the geometric figures meet the preset conditions, it is indicated that a complete image of the two-dimensional code is detected.

If the second image includes the complete image with the image characteristics, the mobile terminal lights up the screen and displays a recognition result of the complete image on the screen. In this way, an image recognition accuracy may be improved by recognizing the second image. In addition, lighting up the screen automatically and displaying the recognition result of the complete image, so that the image recognition efficiency is improved.

This implementation may also be applied to the embodiments corresponding to FIG. 1A, and may achieve same beneficial effects.

In some embodiments of the present disclosure, the step of outputting the prompt information for indicating that the second image is incomplete includes: controlling a partial region of the screen of the mobile terminal to be lit up and displaying the second image in the partial region; or controlling the screen of the mobile terminal to be lit up and displaying the second image on the screen of the mobile terminal.

In this implementation, two ways of displaying the second image may be included.

Figure 2B:
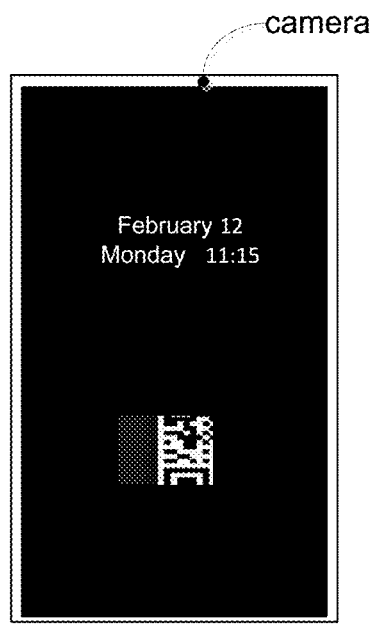
FIG. 2B is a first diagram illustrating a display interface of a mobile terminal, in accordance with embodiments of the present disclosure.

One way is that the mobile terminal lights up a partial region of the screen and displays the second image in the partial region. This way may be understood as that, when the mobile terminal is in the screen-off state, only a partial region on a screen-off interface is lit up, and the second image is displayed in the partial region. As for a specific implementation, reference may be made to the related art. For example, as shown in FIG. 2B, the mobile terminal is in a screen-locked and screen-off state, and a date and a two-dimensional code are displayed in partial regions of the screen. In a process of displaying the second image, current code scanning situations can be obtained without a need to awake an entire screen, which can save the energy consumption.

Figure 2C:
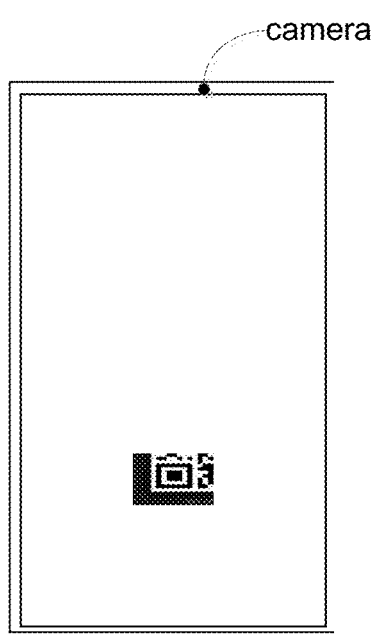
FIG. 2C is a second diagram illustrating a display interface of a mobile terminal, in accordance with embodiments of the present disclosure.

The other way is that the mobile terminal lights up the entire screen and display the second image on the lit-up display screen. For example, as shown in FIG. 2C, a code scanning interface is displayed on the screen.

As for the two ways, an incomplete image may be displayed on the screen, prompt information that complete two-dimensional code data is not obtained currently may be further displayed on the screen, and the user may adjust a position of the mobile terminal based on characteristics of the incomplete image or the prompt information, thereby obtaining a complete image, and improving the object recognition efficiency.

This implementation may also be applied to the embodiments corresponding to FIG. 1A, and may achieve same beneficial effects.

In some embodiments of the present disclosure, the step of outputting the prompt information for indicating that the second image is incomplete includes: outputting voice prompt information including a moving direction of the mobile terminal according to the characteristics of the incomplete image.

In this implementation, if the second image includes the incomplete image with the image characteristic of the target object type, the mobile terminal may determine a shift direction of the image according to the characteristics of the acquired incomplete image, thereby determining a direction in which the mobile terminal needs to be shifted. For example, as for an image of the two-dimensional code shown in FIG. 2B, since the mobile terminal only acquires two positioning points in a shape of a Chinese character of " 回 " of the two-dimensional code, and geometric figures in the image of the two-dimensional code are located on a right side of the positioning points in the shape of the Chinese character of " 回 ", it may be determined that the image of the two-dimensional code is shifted to the right relative to the mobile terminal. Therefore, the mobile terminal needs to be shifted to the right relative to the image of the two-dimensional code to acquire a complete image of the image of the two-dimensional code.

The mobile terminal outputs the voice prompt information including the shift direction of the mobile terminal to prompt the user to move the mobile terminal according to the prompt information, thereby improving the object recognition efficiency.

This implementation may also be applied to the embodiments corresponding to FIG. 1A, and may achieve same beneficial effects.

For further understanding of the present embodiment, the following will be described in conjunction with a flow diagram and a specific implementation.

Figure 2D:
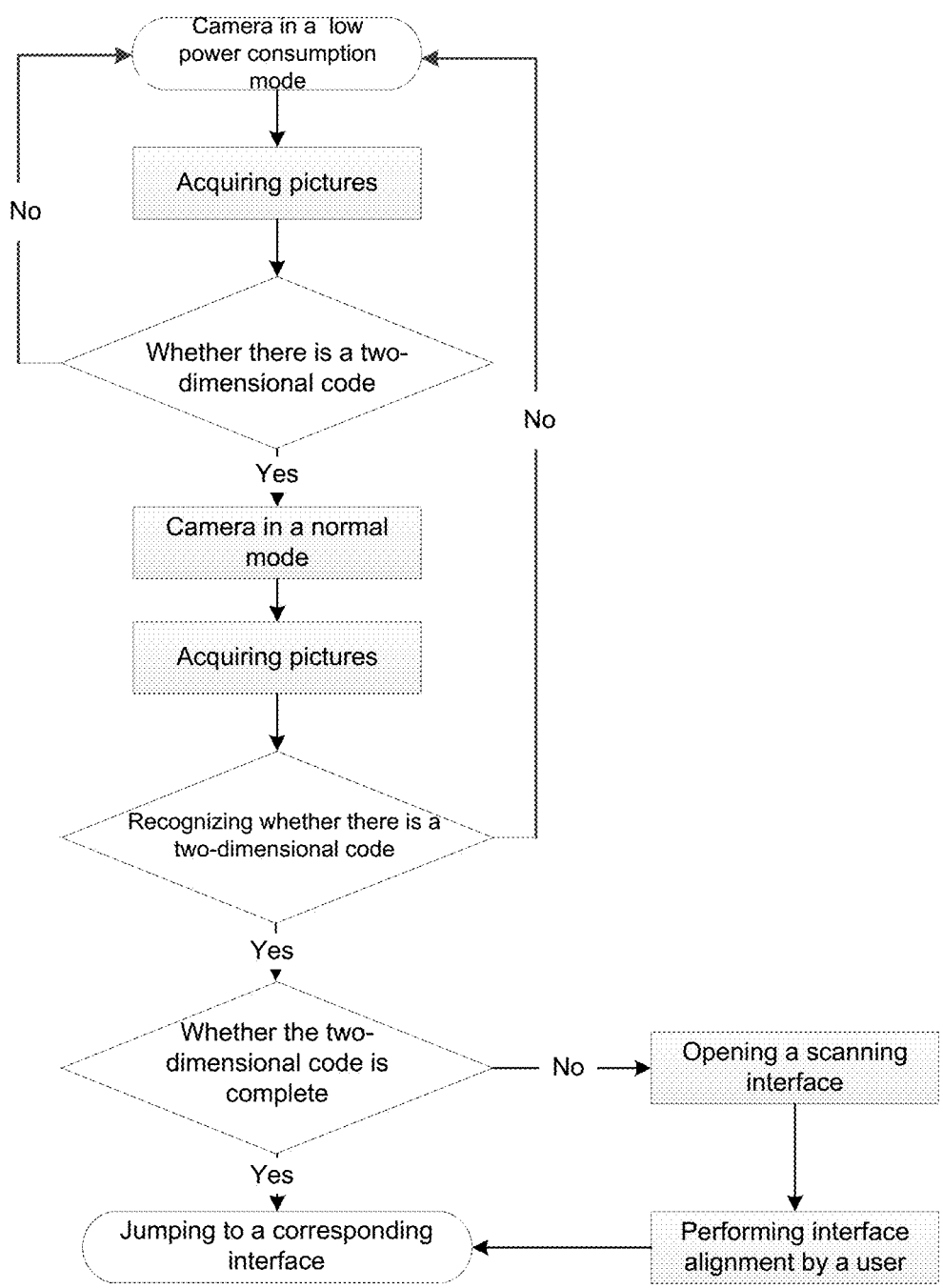
FIG. 2D is a third flow diagram of an object recognition method, in accordance with embodiments of the present disclosure.

As shown in FIG. 2D, the low power consumption mode of the camera is started when the mobile terminal is started up or the screen of the mobile terminal is turned off, that is, the camera operates in the first operating state. The camera in the low power consumption mode acquires a picture, and the mobile terminal recognizes preliminarily the picture acquired by the camera in the low power consumption mode to determine whether there is a two-dimensional code, i.e., a target object type, in the picture. If there is no two-dimension code in the picture, the low-power-consumption camera continues to acquire pictures.

If there is a two-dimension code in the picture, the camera is switched to a normal photographing mode, i.e., the second operating state, and acquires the picture. Since a resolution of a picture acquired through the camera in the normal photographing mode is higher than a resolution of a picture acquired in the low power consumption mode, the mobile terminal recognizes whether a two-dimensional code is included again based on the picture obtained in the normal photographing mode.

If it is recognized that the picture does not include a two-dimensional code, the camera is switched to the low power consumption mode.

If it is recognized that the picture includes a complete two-dimensional code, the mobile terminal will jump to an interface corresponding to the two-dimensional code.

If it is recognized that the picture includes an incomplete two-dimension code, the screen may be lit up and automatically display the code scanning interface; or a partial region of the screen may be lit up in the screen-off state, and the obtained image is displayed in the partial region, and the user is prompted that the complete two-dimensional code data is not obtained currently. The user may adjust the position of the mobile terminal based on the displayed information, thereby enabling the mobile terminal to scan the code.

In this way, the mobile terminal may obtain the code scanning situations without the need to awake the entire screen, which can save the energy consumption and improve the code scanning efficiency.

As for the object recognition method in some embodiments of the present disclosure, in the screen-off state, after the first image acquired through the camera in the first operating state is preliminarily recognized, the camera is switched to the second operating state and acquires the second image, and the second image is recognized, which can improve the image recognition accuracy. In a case where the second image does not include the image with the image characteristics of the target object type, the second operating state is switched to the first operating state, which can save the power consumption.

Figure 3:
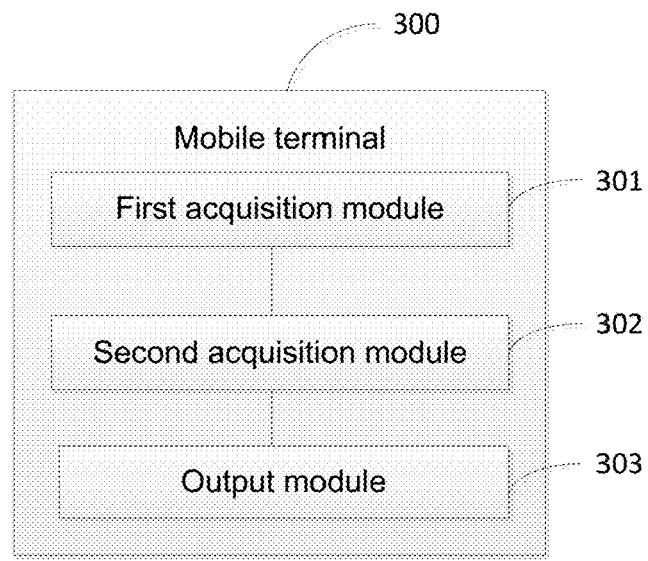
FIG. 3 is a first diagram illustrating a structure of a mobile terminal, in accordance with embodiments of the present disclosure.

Referring to FIG. 3, FIG. 3 is a diagram showing a structure of a mobile terminal, in accordance with embodiments of the present disclosure. As shown in FIG. 3, the mobile terminal 300 includes a first acquisition module 301, a second acquisition module 302, and an output module 303.

The first acquisition module 301 is used to acquire a first image through a camera in a first operating state in a case where the mobile terminal is in a screen-off state.

The second acquisition module 302 is used to control the camera to enter a second operating state if the first image has image characteristics of a target object type, and to acquire a second image through the camera in the second operating state.

The output module 303 is used to output prompt information for indicating that the second image is incomplete if it is recognized that the second image includes an incomplete image with the image characteristics.

An operating power of the camera in the second operating state is higher than an operating power of the camera in the first operating state.

Figure 4:
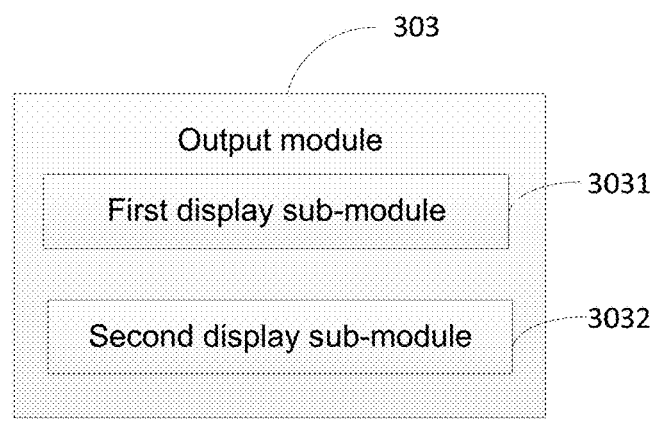
FIG. 4 is a diagram illustrating a structure of an output module in a mobile terminal, in accordance with embodiments of the present disclosure.

Optionally, as shown in FIG. 4, the output module 303 includes:

a first display sub-module 3031 used to control a partial region of the screen of the mobile terminal to be lit up, and to display the second image in the partial region; or a second display sub-module 3032 used to control the screen of the mobile terminal to be lit up, and to display the second image on the screen of the mobile terminal.

Figure 5:
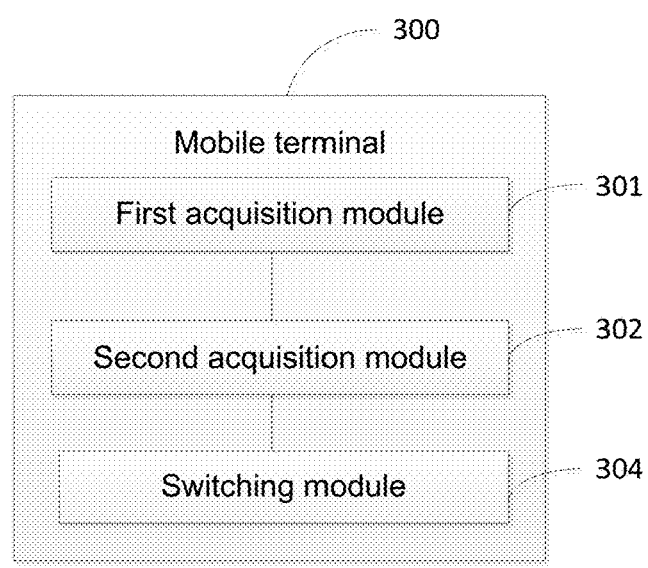
FIG. 5 is a second diagram illustrating a structure of a mobile terminal, in accordance with embodiments of the present disclosure.

Optionally, as shown in FIG. 5, the mobile terminal further includes:

a switching module 304 used to switch the camera from the second operating state to the first operating state if the second image does not include an image with the image characteristics.

Figure 6:
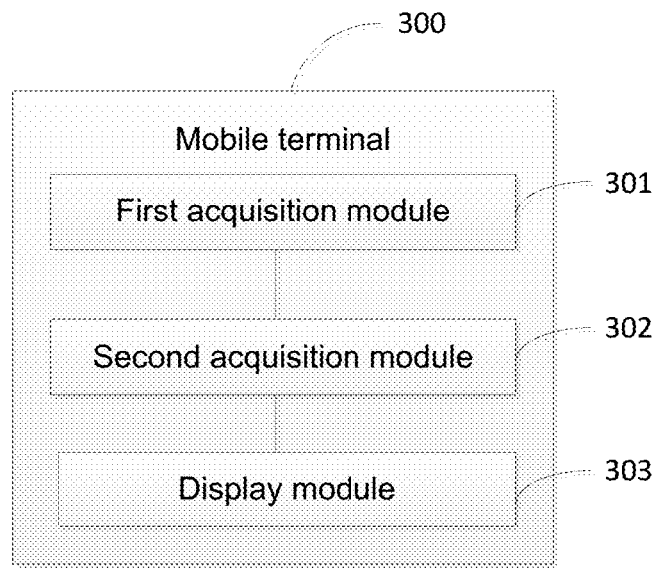
FIG. 6 is a third diagram illustrating a structure of a mobile terminal, in accordance with embodiments of the present disclosure.

Optionally, as shown in FIG. 6, the mobile terminal further includes:

a display module 305 used to control the screen of the mobile terminal to be lit up if the second image includes a complete image with the image characteristics, and control the screen to display a recognition result of the complete image on the screen.

Optionally, the output module 303 is specifically used to output voice prompt information including a moving direction of the mobile terminal according to characteristics of the incomplete image.

The mobile terminal 300 can implement each process implemented by the mobile terminal in the above method embodiments, and details will not be repeated herein to avoid repetition.

As for the mobile terminal 300 in some embodiments of the present disclosure, the mobile terminal may acquire a scanned object in the screen-off state without a need to perform multiple interactive operations by a user to start a code scanning function for acquisition, which improves code scanning efficiency. Moreover, when the mobile terminal recognizes an incomplete image of the target object type, it may output prompt information to prompt the user to shift the mobile terminal to acquire a complete image, which can further improve object recognition efficiency.

Figure 7:
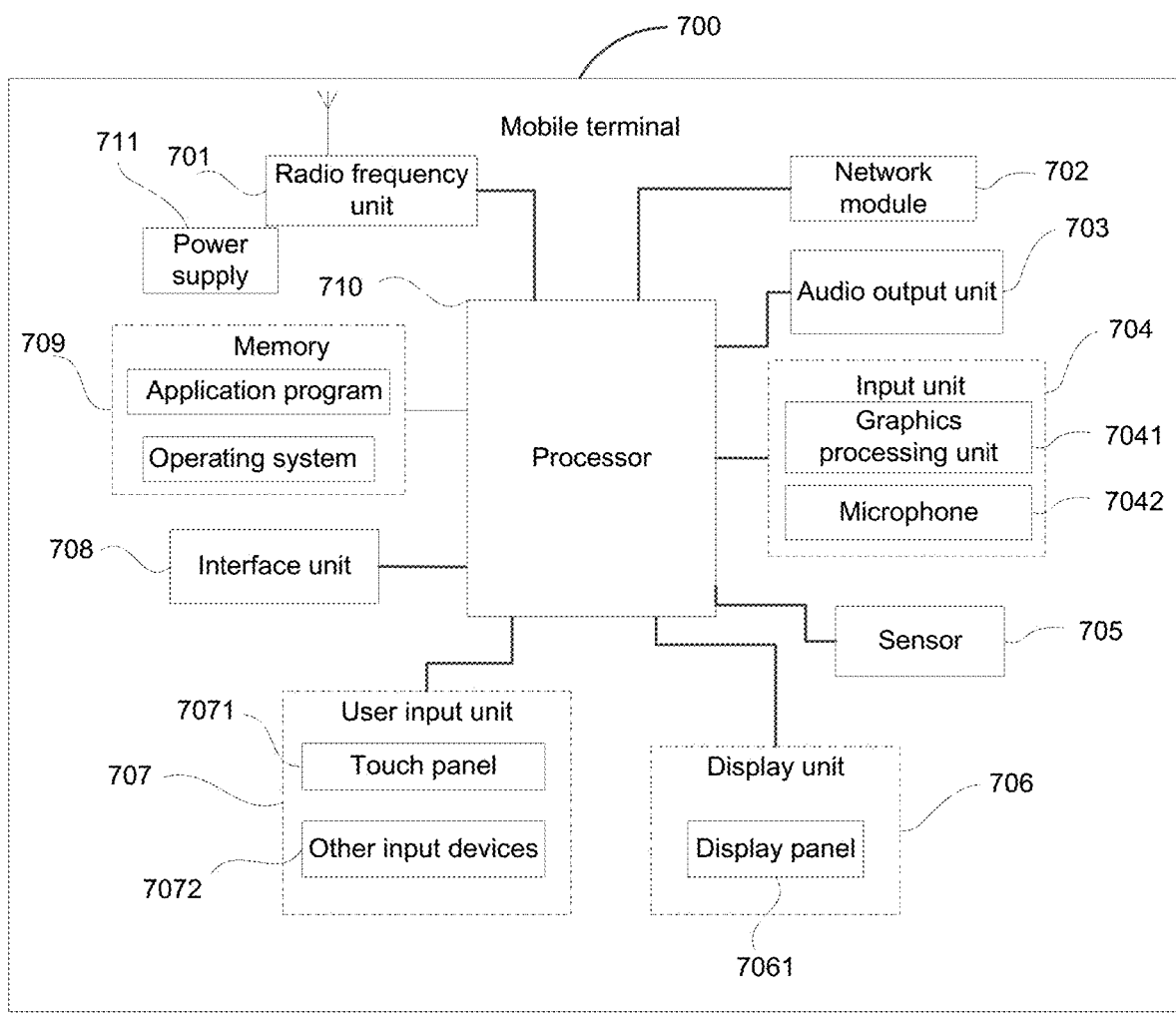
FIG. 7 is a fourth diagram illustrating a structure of a mobile terminal, in accordance with embodiments of the present disclosure.

FIG. 7 is a schematic diagram showing a hardware structure of a mobile terminal for implementing the embodiments of the present disclosure. The mobile terminal 700 includes, but is not limited to, components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art will understand that, the structure of the mobile terminal shown in FIG. 7 does not constitute a limitation on the mobile terminal, and the mobile terminal may include more or fewer components than those shown in the figure, or a combination of certain components, or components with different arrangements. In some embodiments of the present disclosure, the mobile terminals include, but are not limited to, a mobile phone, a tablet computer, a notebook computer, a palmtop computer, a vehicle-mounted terminal, a wearable device and a pedometer.

The processor 710 is used to acquire a first image through a camera in a first operating state in a case where the mobile terminal is in a screen-off state; to control the camera to enter a second operating state if the first image has image characteristics of a target object type, and to acquire a second image through the camera in the second operating state; and to output prompt information for indicating that the second image is incomplete if it is recognized that the second image includes an incomplete image with the image characteristics; an operating power of the camera in the second operating state is higher than an operating power of the camera in the first operating state.

In this way, the mobile terminal may acquire a scanned object in the screen-off state without a need to perform multiple interactive operations by a user to start a code scanning function for acquisition, which can improve code scanning efficiency. Moreover, when an incomplete image of the target object type is recognized, prompt information may be output to prompt the user to shift the mobile terminal to acquire a complete image, which can further improve object recognition efficiency.

Optionally, performing, by the processor 710, the output of the prompt information for indicating that the second image is incomplete includes: controlling a partial region of the screen of the mobile terminal to be lit up and displaying the second image in the partial region; or controlling the screen of the mobile terminal to be lit up and displaying the second image on the screen of the mobile terminal.

Optionally, after the processor 710 performs the acquisition of the second image through the camera in the second operating state, the method further includes: if the second image does not include an image with the image characteristics, switching the camera from the second operating state to the first operating state.

Optionally, after the processor 710 performs the acquisition of the second image through the camera in the second operating state, the method further includes: if the second image includes a complete image with the image characteristics, controlling the screen of the mobile terminal to be lit up and controlling the screen to display a recognition result of the complete image on the screen.

Optionally, performing, by the processor 710, the output of the prompt information for indicating that the second image is incomplete: outputting voice prompt information including a moving direction of the mobile terminal through the audio output unit 703 according to characteristics of the incomplete image.

It will be understood that, in some embodiments of the present disclosure, the radio frequency unit 701 may be used to receive and transmit signals in a process of receiving and sending information or during a call. The radio frequency unit 701 receives downlink data from a base station and then transmits the downlink data to the processor 710 to process the data. In addition, the radio frequency unit 701 transmits uplink data to the base station. Generally, the radio frequency unit 701 includes, but is not limited to, an antenna, at least one amplifier, a transceiver, a coupler, a low noise amplifier, and a duplexer. In addition, the radio frequency unit 701 may also communicate with a network and other devices through a wireless communication system.

The mobile terminal provides the user with wireless broadband access to Internet through the network module 702, such as helping the user to send and receive e-mails, to browse web pages, and to access streaming media.

The audio output unit 703 may convert audio data received by the radio frequency unit 701 or the network module 702 or stored in the memory 709 into audio signals and output the audio signals as sound. Moreover, the audio output unit 703 may also output audio associated with a specific function performed by the mobile terminal 700

(e.g., call signal reception sound and message reception sound). The audio output unit 703 includes a speaker, a buzzer, and a receiver.

The input unit 704 is used to receive audio signals or video signals. The input unit 704 may include a graphics processing unit (GPU) 7041 and a microphone 7042. The GPU 7041 processes image data of still pictures or videos obtained by an image capture device (e.g., a camera) in a video capture mode or an image capture mode. The processed image frames may be displayed on the display unit 706. The image frames processed by the GPU 7041 may be stored in the memory 709 (or other storage media) or sent via the radio frequency unit 701 or the network module 702. The microphone 7042 may receive sound and is capable of processing such sound into audio data. The processed audio data may be converted into a format that may make the processed audio data transmitted to a mobile communication base station through the radio frequency unit 701 in a case of a phone call mode.

The mobile terminal 700 further includes at least one type of sensor 705, such as a light sensor, a motion sensor, and other sensors. The light sensor includes an ambient light sensor and a proximity sensor. The ambient light sensor may adjust brightness of a display panel 7061 according to brightness of ambient light. The proximity sensor may turn off the display panel 7061 and/or backlight when the mobile terminal 700 is moved to an ear. As a type of the motion sensor, an accelerometer sensor may detect magnitudes of accelerations in various directions (generally three axes), and may detect a magnitude and a direction of gravity when the accelerometer sensor is still, and may be used to recognize postures of the mobile terminal (e.g., horizontal-vertical screen switching, related games, and magnetometer posture calibration), and recognize related functions (e.g., pedometer and knocking) through vibration. The sensor 705 may further include a fingerprint sensor, a pressure sensor, an iris sensor, a molecular sensor, a gyroscope, a barometer, a hygrometer, a thermometer, or an infrared sensor, and details will not be repeated herein.

The display unit 706 is used to display information input by the user or information provided to the user. The display unit 706 may include the display panel 7061, which may be configured in a form of a liquid crystal display (LCD), organic light-emitting diodes (OLEDs), or the like.

The user input unit 707 may be used to receive input digital or character information and generate input key signals related to user settings and function control of the mobile terminal. The user input unit 707 includes a touch panel 7071 and other input devices 7072. The touch panel 7071, also referred to as a touch screen, may acquire a touch operation by the user on or near the touch panel 7071 (e.g., an operation by the user on or near the touch panel 7071 by using a finger, a stylus, or any other suitable object or attachment). The touch panel 7071 may include two portions, i.e., a touch detection device and a touch controller. The touch detection device detects a position touched by the user, and a signal from the touch operation and transmits the signal to the touch controller. The touch controller receives touch information from the touch detection device, converts the touch information into coordinates of a touch point, sends the coordinates of the touch point to the processor 710, receives a command from the processor 710, and executes the command. In addition, the touch panel 7071 may be implemented by various types of touch panels such as a resistive touch panel, a capacitive touch panel, an infrared touch panel, and a surface acoustic wave touch panel. The user input unit 707 may further include other input devices 7072 in addition to the touch panel 7071. The other input devices 7072 may include, but are not limited to, a physical keyboard, function keys (e.g., volume control keys and an on/off key), a trackball, a mouse, and a joystick, and details will not be repeated herein.

The touch panel 7071 may cover the display panel 7061. After the touch panel 7071 detects a touch operation on or near it, the touch panel 11071 sends the touch operation to the processor 710 to determine a type of the touch event. Then, the processor 710 provides a corresponding visual output on the display panel 7061 according to the type of the touch event. Although in FIG. 7, the touch panel 7071 and the display panel 7061 are used as two separate components to implement an input function and an output function of the mobile terminal, in some embodiments, the touch panel 7071 may be integrated with the display panel 7061 to implement the input function and the output function of the mobile terminal, which is not limited herein.

The interface unit 708 is an interface for connecting an external device to the mobile terminal 700. For example, the external device may include a port for wired or wireless headsets, a port for an external power supply (or battery charger), a port for wired or wireless data, a port for a memory card, a port for connecting a device with a recognition module, an audio input/output (I/O) port, a video I/O port, and an earphone port. The interface unit 708 may be used to receive input from the external device (e.g., data information and power) and transmit the received input to one or more elements in the mobile terminal 700, or may be used to transmit data between the mobile terminal 700 and the external device.

The memory 709 may be used to store software programs and various data. The memory 709 may mainly include a program storage region and a data storage region. The program storage region may store an operating system and application programs required by at least one function (e.g., a sound playing function or an image playing function). The data storage region may store data (e.g., audio data and a phonebook) created according to use of a mobile phone. In addition, the memory 709 may include a high-speed random access memory, and may further include a non-volatile memory, such as at least one magnetic disk storage device, a flash memory device, or other non-volatile solid-state storage device.

The processor 710 is a control center of the mobile terminal. The processor 710 is used to connect various parts of the entire mobile terminal through various interfaces and wires, and perform various functions of the mobile terminal and process data by running or executing software programs and/or modules stored in the memory 709 and invoking data stored in the memory 709, thereby monitoring the mobile terminal entirely. The processor 710 may include one or more processing units. In some embodiments of the present disclosure, an application processor and a modem processor may be integrated in the processor 710. The application processor is mainly responsible for the operating system, user interfaces and application programs, and the modem processor is mainly responsible for wireless communication. It will be understood that, the modem processor may not be integrated in the processor 710.

The mobile terminal 700 may further include the power supply 711 (e.g., a battery) for supplying power to various components. The power supply 711 may be logically connected to the processor 710 through a power management system, so that functions such as charging management, discharging management and power consumption management are achieved through the power management system.

In addition, the mobile terminal 700 includes some functional modules that are not shown, which will not be repeated herein.

Some embodiments of the present disclosure further provide a mobile terminal. The mobile terminal includes a processor 710, a memory 709, and computer programs stored in the memory 709 and capable of running on the processor 710. The computer programs, when executed by the processor 710, cause the processor 710 to perform each process in the above embodiment of the object recognition method. The mobile terminal can achieve same technical effects as the object recognition method, and details will not be repeated herein to avoid repetition.

Some embodiments of the present disclosure further provide a non-transitory computer-readable storage medium. The non-transitory computer-readable storage medium stores computer programs that, when executed by a processor, cause the processor to perform each process in the above embodiment of the object recognition method. The non-transitory computer-readable storage medium can achieve same technical effects as the object recognition method, and details will not be repeated herein to avoid repetition. The non-transitory computer-readable storage medium may be a read-only memory (ROM), a random access memory (RAM), a magnetic disk or an optical disk.

It will be noted that, the terms such as "includes", "including", or any other variants thereof herein are intended to cover a non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "including a . . . " does not exclude existence of other identical elements in a process, a method, an article, or a device that includes the element.

Through the description of the above embodiments, a person skilled in the art will clearly understand that, the method in the above embodiment may be implemented by means of software and a necessary general-purpose hardware platform. The method may also be implemented through hardware, but in many cases, the former is a better implementation. Based on such understanding, the technical solution in the present disclosure essentially or a part contributing to the prior art may be embodied in a form of a software product. The computer software product is stored in a storage medium (e.g., a ROM/RAM, a diskette, or an optical disk), and includes some instructions that cause a mobile terminal (which may be a mobile phone, a computer, a server, an air conditioner, or a network side device) to perform the method described in the embodiments of the present disclosure.

The embodiments of the present disclosure are described above with reference to the accompanying drawings. However, the present disclosure is not limited to the above specific implementations. The above specific implementations are merely examples and are not restrictive. Under enlightenment of the present disclosure, a person of ordinary skill in the art may make multiple forms without departing from spirit of the present disclosure and the protection scope of the claims, all of which fall within the protection scope of the present disclosure.

What is claimed is:

1. An object recognition method applied to a mobile terminal with a camera, the method comprises:
  acquiring a first image through the camera in a first operating state in a case where the mobile terminal is in a screen-off state;
  if the first image has image characteristics of a target object type, controlling the camera to enter a second operating state, and acquiring a second image through the camera in the second operating state;
  if it is recognized that the second image includes an incomplete image with the image characteristics of the target object type, outputting prompt information for indicating that the second image is incomplete; and
  if the second image does not include an image with the image characteristics, switching the camera from the second operating state to the first operating state after acquiring the second image through the camera in the second operating state;
  wherein an operating power of the camera in the second operating state is higher than an operating power of the camera in the first operating state.

2. The method according to claim 1, wherein the outputting the prompt information for indicating that the second image is incomplete comprises:
  controlling a partial region of the screen of the mobile terminal to be lit up, and
  displaying the second image in the partial region; or
  controlling the screen of the mobile terminal to be lit up, and displaying the second image on the screen of the mobile terminal.

3. The method according to claim 1, wherein after acquiring the second image through the camera in the second operating state, the method further comprises:
  if the second image includes a complete image with the image characteristics, controlling the screen of the mobile terminal to be lit up and
  controlling the screen to display a recognition result of the complete image.

4. The method according to claim 1, wherein the outputting the prompt information for indicating that the second image is incomplete comprises:
  outputting voice prompt information including a moving direction of the mobile terminal according to characteristics of the incomplete image.

5. A mobile terminal, the mobile terminal comprises a camera and a processor connected with the camera, wherein the processor is configured to:
  acquiring a first image through the camera in a first operating state in a case where the mobile terminal is in a screen-off state;
  if the first image has image characteristics of a target object type, controlling the camera to enter a second operating state, and acquiring a second image through the camera in the second operating state;
  if it is recognized that the second image includes an incomplete image with the image characteristics of the target object type, outputting prompt information for indicating that the second image is incomplete; and
  if the second image does not include an image with the image characteristics, switching the camera from the second operating state to the first operating state;
  wherein an operating power of the camera in the second operating state is higher than an operating power of the camera in the first operating state.

6. The mobile terminal according to claim 5, wherein the processor is configured to:
  controlling a partial region of the screen of the mobile terminal to be lit up, and
  displaying the second image in the partial region; or
  controlling the screen of the mobile terminal to be lit up, and displaying the second image on the screen of the mobile terminal.

7. The mobile terminal according to claim 5, wherein the processor is configured to:
if the second image includes a complete image with the image characteristics, controlling the screen of the mobile terminal to be lit up and
controlling the screen to display a recognition result of the complete image.

8. The mobile terminal according to claim 5, wherein the processor is configured to:
outputting voice prompt information including a moving direction of the mobile terminal through an audio output unit according to characteristics of the incomplete image.

9. A non-transitory computer-readable storage medium, wherein the non-transitory computer-readable storage medium stores computer programs that, when executed by a processor, cause the processor to perform:
acquiring a first image through the camera in a first operating state in a case where the mobile terminal is in a screen-off state;
if the first image has image characteristics of a target object type, controlling the camera to enter a second operating state, and acquiring a second image through the camera in the second operating state; and
if it is recognized that the second image includes an incomplete image with the image characteristics of the target object type, outputting prompt information for indicating that the second image is incomplete; and
if the second image does not include an image with the image characteristics, switching the camera from the second operating state to the first operating state;
wherein an operating power of the camera in the second operating state is higher than an operating power of the camera in the first operating state.

10. The non-transitory computer-readable storage medium according to claim 9, wherein the computer program, when executed by the processor, causes the processor to perform:
controlling a partial region of the screen of the mobile terminal to be lit up, and
displaying the second image in the partial region; or
controlling the screen of the mobile terminal to be lit up, and displaying the second image on the screen of the mobile terminal.

11. The non-transitory computer-readable storage medium according to claim 9, wherein the computer program, when executed by the processor, causes the processor to further perform:
if the second image includes a complete image with the image characteristics, controlling the screen of the mobile terminal to be lit up; and
controlling the screen to display a recognition result of the complete image.

12. The non-transitory computer-readable storage medium according to claim 9, wherein the computer program, when executed by the processor, causes the processor to further perform:
outputting voice prompt information including a moving direction of the mobile terminal according to characteristics of the incomplete image.

13. The method according to claim 1, wherein the operating power of the camera in the second operating state is higher than the operating power of the camera in the first operating state comprises:
in a case that a number of pixel units turned on in the second operating state is greater than a number of pixel units turned on in the first operating state, the operating power of the camera in the second operating state being higher than the operating power of the camera in the first operating state.

14. The mobile terminal according to claim 5, wherein the operating power of the camera in the second operating state is higher than the operating power of the camera in the first operating state comprises:
in a case that a number of pixel units turned on in the second operating state is greater than a number of pixel units turned on in the first operating state, the operating power of the camera in the second operating state being higher than the operating power of the camera in the first operating state.

15. The non-transitory computer-readable storage medium according to claim 9, wherein the operating power of the camera in the second operating state is higher than the operating power of the camera in the first operating state comprises:
in a case that a number of pixel units turned on in the second operating state is greater than a number of pixel units turned on in the first operating state, the operating power of the camera in the second operating state being higher than the operating power of the camera in the first operating state.

* * * * *